US007781912B2

(12) United States Patent
McKenzie

(10) Patent No.: US 7,781,912 B2
(45) Date of Patent: Aug. 24, 2010

(54) UNINTERRUPTIBLE POWER SUPPLY WITH OPTO-ELECTRIC COUPLERS FOR DETECTING THE STATUS OF EACH SOURCE

(75) Inventor: David McKenzie, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1104 days.

(21) Appl. No.: 11/433,582

(22) Filed: May 15, 2006

(65) Prior Publication Data

US 2007/0262648 A1 Nov. 15, 2007

(51) Int. Cl.
*H02J 9/06* (2006.01)

(52) U.S. Cl. .......................................................... 307/64

(58) Field of Classification Search .................. 307/64, 307/85–87

See application file for complete search history.

(56) References Cited

U.S. PATENT DOCUMENTS

| | | | | |
|---|---|---|---|---|
| 4,471,233 | A * | 9/1984 | Roberts | 307/66 |
| 5,612,580 | A * | 3/1997 | Janonis et al. | 307/64 |
| 5,739,594 | A * | 4/1998 | Sheppard et al. | 307/64 |
| 5,814,956 | A * | 9/1998 | Kono et al. | 318/380 |
| 6,011,324 | A * | 1/2000 | Kohlstruck et al. | 307/64 |
| 6,614,671 | B2 * | 9/2003 | Thrap | 363/67 |
| 6,630,753 | B2 * | 10/2003 | Malik et al. | 307/64 |
| 6,717,786 | B2 * | 4/2004 | Holley et al. | 361/93.1 |
| 6,764,785 | B2 * | 7/2004 | Colborn et al. | 429/23 |
| 6,879,132 | B2 * | 4/2005 | Oki et al. | 320/128 |
| 7,045,238 | B2 | 5/2006 | Gottmann et al. | |
| 7,060,379 | B2 * | 6/2006 | Speranza et al. | 429/9 |
| 7,602,073 | B2 * | 10/2009 | Meyers et al. | 290/1 A |
| 7,608,943 | B2 * | 10/2009 | Sekai | 307/64 |
| 2004/0224193 | A1 | 11/2004 | Mitlitsky et al. | |
| 2005/0048334 | A1 | 3/2005 | Sridhar et al. | |
| 2005/0164051 | A1 | 7/2005 | Venkataraman et al. | |

FOREIGN PATENT DOCUMENTS

WO WO2005/069776 8/2005

OTHER PUBLICATIONS

U.S. Appl. No. 11/404,760, filed Apr. 17, 2006, Abhijit Dutta et al.

* cited by examiner

*Primary Examiner*—Stephen W Jackson
*Assistant Examiner*—Adi Amrany
(74) *Attorney, Agent, or Firm*—The Marbury Law Group PLLC

(57) ABSTRACT

A system, method and device for power switching and power control, particularly for switching the source of power between two or more power sources are provided. Power control elements testing the availability and stability of alternate power sources and switch loads between these power sources in short periods of time and with advantageous switching characteristics. In a fuel-cell system, the embodiments of the invention may be advantageously deployed to power up balance of plant loads using opto-electronic couplers and electronic relays.

20 Claims, 4 Drawing Sheets

UNINTERRUPTIBLE POWER SUPPLY WITH OPTO-ELECTRIC COUPLERS FOR DETECTING THE STATUS OF EACH SOURCE

BACKGROUND OF THE INVENTION

Embodiments of the present invention relate generally to the field of power supply control systems. Particular embodiments relate to the application of fuel cells for power generation. More particularly, embodiments of the present invention relate to the control of power supply to and from fuel cell systems used for primary or backup power supply.

Fuel cell systems can be employed as a reliable and efficient primary or backup power source for critical applications that normally use power drawn from the utility grid. A typical fuel cell system for electrical power includes a fuel cell stack which is the power generating component of the system, an inverter to convert the direct current produced by the fuel cell stack to an alternating current, a fuel source, for example in a solid oxide fuel cell system (SOFC) typically a hydrogen or hydrocarbon fuel, and a number of components, such as heat exchangers, valves, blowers, etc., designed to ensure the proper functioning of the power generation components, often referred to as the “balance of plant”. The balance of plant components can be powered by utility grid power rather than by the fuel cell stack.

A SOFC backup power system, for example, can be regeneratively coupled to the utility grid. This means that the fuel cell can provide power to the primary application if the grid goes offline or, when the grid is functioning normally, the fuel cell can reverse cycles and regenerate fuel for operating the system, or function as a current source for the grid.

In grid interconnected systems, it is important that a power source be applied to the balance of plant loads in a short period of time in the event of grid failure, otherwise there may be damage to the fuel cell stack. Unfortunately, it has been seen that mechanical contactors are often too slow to provide backup power to the balance of plant loads in the event of grid loss. In the past, this problem has been alleviated by means of an uninterruptible power supply (UPS), having batteries and other storage devices such as capacitors. Uninterruptible power supplies are, however, expensive and cumbersome to implement.

SUMMARY OF THE INVENTION

Embodiments of the present invention relate generally to methods, systems and devices for accomplishing a switch to and from fuel cell or grid power in a fast and electrically optimal manner, while lessening the need for an uninterruptible power supply.

One aspect of the invention relates to a circuit, comprising: a first power source connected to a first opto-electric coupler; a first line configured to provide a control signal related to a second power source, the first line being connected to a second opto-electric coupler; and logic for emitting a second control signal for switching between the first power source and a second power source upon a change in state of at least one of the first or second opto-electric couplers. Of course, as will be clear to a person of skill in the art, the term “connected to” should not be interpreted to mean “directly connected to”.

Another aspect of the invention relates to a method for providing power in a fuel cell system, comprising: determining in a first step, using a first opto-electric coupler, whether a first power source is present; determining in a second step, using a second opto-electric coupler, a presence of a control signal indicative of a second power source; and responsive to the determining in the first and second steps, powering a fuel cell balance of plant with either the first or second power sources.

Yet another aspect of the invention relates to a system for power control, comprising: a load to be supplied with power; a first power source connected with the load over at least a first electronic relay; a second power source connected with the load over at least a second electronic relay; and a control circuit for controlling the first and second relays, such that the relays are in opposite states except during moments of transition.

DETAILED DESCRIPTION OF THE PREFERRED EMBODIMENTS

Figure 1:
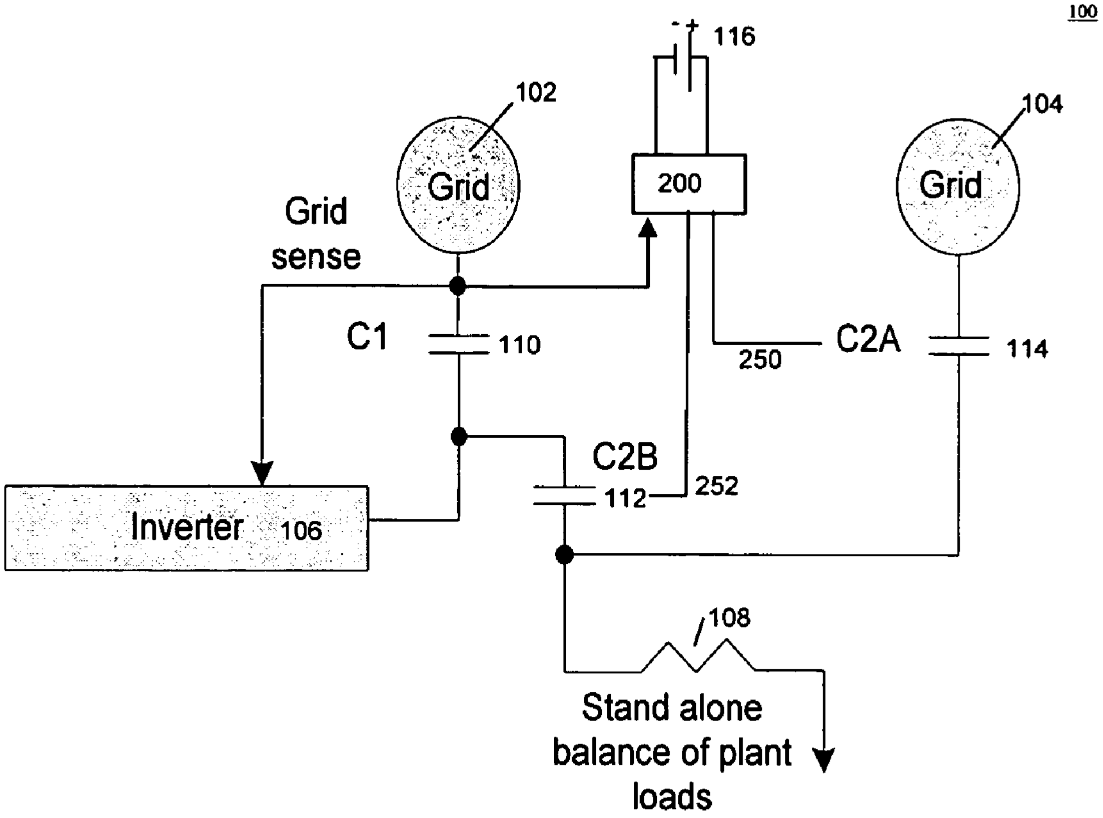
FIG. 1 is a diagram showing a system overview of an exemplary embodiment of the invention.

FIG. 1 shows a fuel cell power generation system 100 according to an embodiment of the present invention having connections 102 and 104 to the utility power grid, an inverter 106 for converting fuel cell generated direct current (DC) to an alternating current, a stand alone balance of plant load 108, as well as contactors 110, 112 and 114. FIG. 1 further shows a battery 116, a control circuit 200 with a grid input, and control outputs 250 and 252 from circuit 200 which are connected to relays 112 and 114 respectively.

During normal grid operation, contactor 110 is closed to allow reverse grid interconnection. Contactor 110 can be a standard mechanical contactor such as, for example, mechanical contactors driven by a pilot relay. Contactors 112 and 114 are electronic relays, preferably solid state relays such as Silicon Controlled Rectifiers (SCRs), and in a preferred embodiment capable of changing states in 8.33 milliseconds or less. In a de-energized state, or in the event of grid failure, it can be necessary to power the balance of plant loads from an alternate source. If there is no or limited power in the system, however, it is difficult to control electronic relays 112 and 114.

Embodiments of the present invention can therefore be advantageously used with a control circuit that is powered from a fuel cell battery. A fuel cell battery 116 can either be a battery present in the fuel cell system as a supplemental DC voltage source, or a battery present in the system for an auxiliary purpose, such as the control of transients or the absorption of power ripples produced by the fuel cell inverter.

Figure 2:
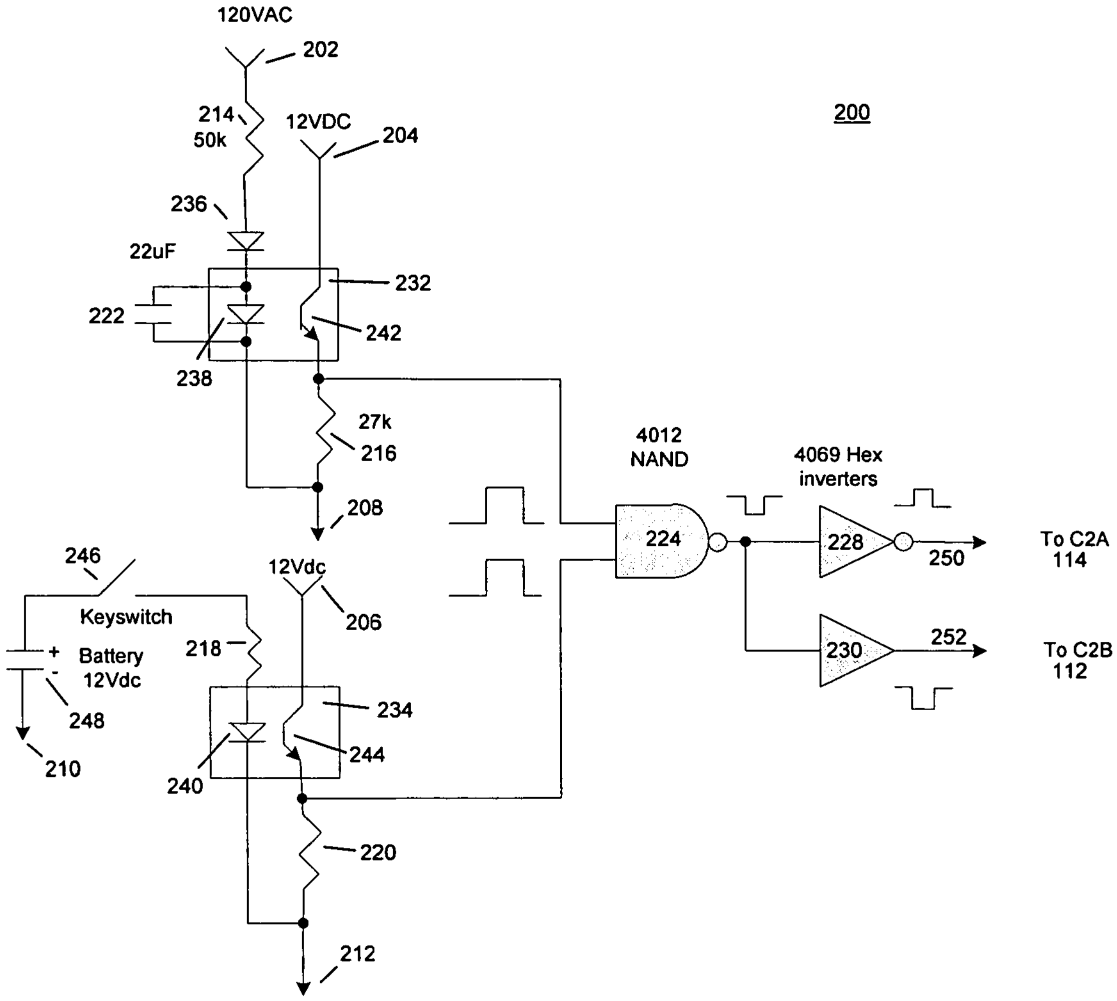
FIG. 2 shows a control circuit that can be used with embodiments of the invention.

Turning to FIG. 2, an exemplary circuit 200 is shown for effecting embodiments of the present invention. The circuit 200 has a grid connection 202, battery or other DC source connections 204 and 206, which can be connected to a fuel cell battery 116 as described above, for example, ground or reference potential connections 208, 210 and 212, resistors 214, 216, 218 and 220, and a capacitor 222. Circuit 200 also has an NAND gate 224 that can be, for example, from a 4012 dual 4-input NAND gate, an inverter 228, and a pass-through gate 230. Both inverter 228 and gate 230 can be constructed from 4069 Hex Inverters. The use of multiple inputs for the NAND gate and inverters assists in developing a three-phase circuit, which will react to changes in any phase of the system in an economical manner. The circuit 200 is shown for a single phase, but it will be clear to people of skill in the art that a three-phase variant can be constructed.

Circuit 200 further comprises opto-electric couplers 232 and 234 (i.e. opto-couplers), which can be, for example, 2271 opto-couplers sold by NEC, Inc., each comprising a respective light-emitting diode (LED) 238, 240 and a corresponding phototransistor 242, 244. As is known in the art, in an opto-coupler, the radiation emitted by a light-emitting diode is received by a photo transistor or other suitable photodetector. The phototransistor or other suitable photodetector is turned on in response to receiving the LED radiation. Circuit 200 further comprises a diode 236, a switch 246, a DC voltage source 248 and outputs 250 and 252. Outputs 250 and 252 are connected to contactors 114 and 112. These contactors are shown in FIG. 1.

If the fuel cell ignition key is in the "off" position, reflecting an inactive state of the fuel cell system, switch 246 will be open. Once the ignition key is turned on, the balance of plant loads will need to be powered up quickly. Assuming the grid is powered on at connection 202, current will flow through resistor 214, which serves to limit current flow to a manageable amount according to the circuit implementation, and which in exemplary embodiments can be dimensioned at approximately 50 kilo Ohms, resulting in an AC current of approximately 1.2 milliamperes.

Diode 236 allows current to pass through only during the positive cycle of the current. This excites light-emitting diode 238 and simultaneously charges capacitor 222, which in exemplary embodiments can be approximately 22 microFarads for a 120 Volt alternating current grid connection. On the negative half cycle, capacitor 222 discharges to hold light-emitting diode 238 in an excited state.

The light emitted by light-emitting diode 238 acts as a gate of transistor 242, providing radiation to the channel of transistor 242 and serves to allow current to flow from source to drain of transistor 242, thus allowing the flow of direct current from battery or other direct current connection 204. Resistor 216 is so dimensioned as to hold one of the inputs to NAND gate 224 at high potential (HI) when opto-electric coupler 232 is closed (active). Resistor 216 is also so dimensioned so that when opto-electric coupler 232 is open (inactive), the respective input to NAND gate 224 is held at low potential (LO), that is, that the resistance of the opto-electric coupler 232 is much larger than that of the resistor when opto-electric coupler 232 is open. The transistor 242 thus functions in this manner as a pull-up transistor. Resistor 216 is further dimensioned to take into account the desired shape of any voltage tail, as described hereinafter. In exemplary embodiments, the resistor 216 can be approximately 27 kilo Ohms.

When switch 246 is open, LED 240 is de-energized and phototransistor 244 is open, causing the top of 220 to be LO. This causes NAND gate 224 to have a HI output, causing the output of 228 to be LO and correspondingly turning on relay 112 and turning off relay 114, which isolates the inactive inverter from the utility grid 104 (shown in FIG. 1).

Thus, the normal functioning of the grid with switch 246 open will cause contact 114 to be open, and require the balance of plant to be driven from the inverter. Since the fuel cell ignition key is in the "off" position, the balance of plant will be driven by the inverter drawing on battery power. Contact 114 will also be open, isolating the grid from the balance of plant.

If the grid is operating normally, but switch 246 is closed indicating that the fuel cell ignition key has been placed in the "on" position, the circuit changes output states. As the grid is still active, the functioning of opto-electric coupler 232 remains the same, and the top input to NAND gate 224 is still HI. The bottom input to NAND gate 224 will also be HI, as opto-electric coupler 234 will be closed, causing transistor 244 to pull up the voltage at the second input of NAND gate 224. If all three grid phases are present in a three-phase system, the output of NAND gate 224 will be LO. In this situation, output 250 will be HI and output 252 will be LO, which will apply power from the grid to the balance of plant and isolate the balance of plant from the inverter, by opening contactor 112 and closing contactor 114 (shown in FIG. 1).

Similarly, if the grid should suffer from an interruption, regardless of the state of switch 246, opto-electric coupler 232 will open, causing the upper input to NAND gate 224 to be LO. In this situation, output 250 will be LO and output 252 will be HI, which will also apply power from the inverter to the balance of plant and isolate the balance of plant from the grid, by closing contactor 112 and opening contactor 114.

The circuit 200 generally provides for the contactors 112 and 114 (shown in FIG. 1) to be in opposite states. Thus, for example, if contactor 112 is open, contactor 114 will be closed, and vice versa. This will hold true with the present exemplary embodiments except in moments of transition. Of course, it is possible to design circuit 200 such that any number of logical states of different contactors may be encompassed.

Figure 3:
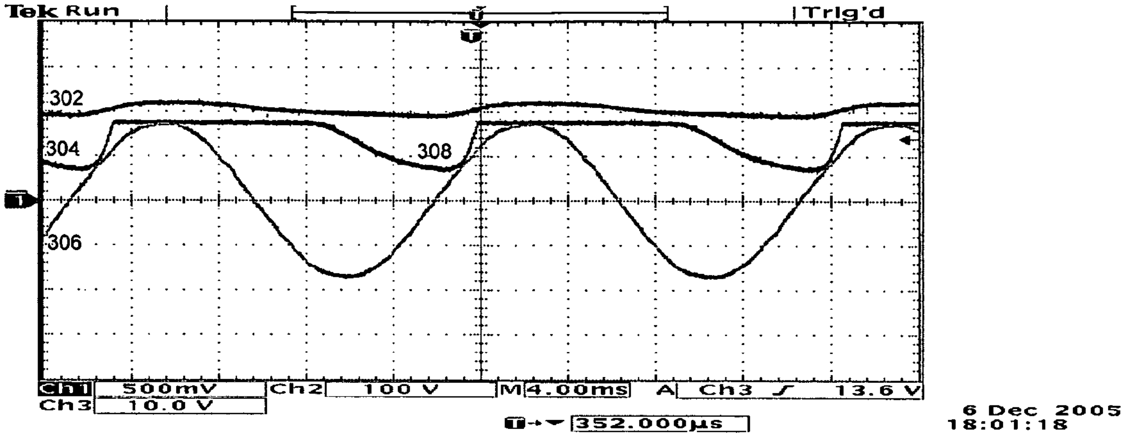
FIG. 3 is a plot of voltage versus time for various voltages in an exemplary embodiment of the invention.

FIG. 3 shows plots 302, 304 and 306 of various voltages with time for the embodiment shown in FIG. 2. Plot 302 is a plot of grid voltage between contact 202 and ground contact 208 with time. Plot 304 is a plot of voltage over resistor 216 with time. Plot 306 is a plot of voltage over the LED 238 in opto-coupler 232.

As can be seen from FIG. 3, on the positive half cycle of the grid voltage in plot 302, capacitor 222 is charged to its full voltage, and the opto-electric coupler 232 is closed, allowing the full voltage drop across resistor 216. In the negative half cycle, capacitor 222 begins to discharge, but is so dimensioned in conjunction with resistor 216, that insufficient discharge current can flow to allow the voltage over light-emitting diode 238 (provided by the capacitor) to drop fully below the emission threshold. Thus, the potential at the input of NAND gate 224 does not drop below the switching threshold.

There can be, however, a voltage tail 308 at the input to NAND gate 224, as shown in FIG. 3. The voltage tail can be caused by an increase in channel resistance of transistor as the capacitor 222 discharges and as the voltage over light-emitting diode 238 drops. Before the channel resistance of transistor 242 can become so high that the potential at the input of NAND gate 224 drops below the switching threshold, however, grid voltage enters the positive half cycle again.

The sharpness of voltage tail 308 can be regulated by optimizing the resistance of resistor 216. An increase in resistance lessens drop in potential at the input of NAND gate 224 caused by increases in channel resistance of transistor 242. Since channel resistance increases exponentially with decreasing voltage near the emission threshold of light-emitting diode 238, however, a slight voltage drop may be observable toward the end of the negative half-cycle. An increase in the resistance of resistor 216 postpones the observability of voltage tail 308.

Voltage tail 308 can be used in a number of applications. For example, since the voltage tail occurs primarily toward the end of the negative half-cycle, the voltage tail can be used in combination with a comparator as a positive/negative half-cycle indicator. Since the voltage tail 308 occurs once per cycle, it can be communicated to a synch circuit, processor, microcontroller or similar circuit to perform a frequency monitoring function.

Figure 4:
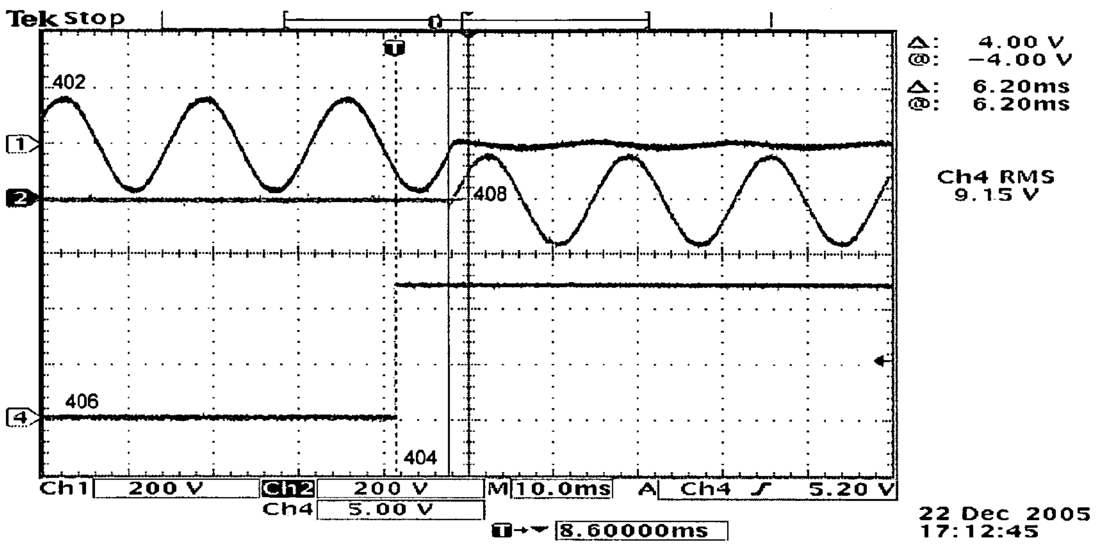
FIG. 4 is a plot of voltage versus time for various voltages in an exemplary embodiment of the invention.

FIG. 4 provides an illustration of the switching quality of embodiments of the present invention. Plot 402 shows grid voltage during normal operation. At time 404, a control signal 406, for example from the output of opto-coupler 232 in FIG. 2, is received indicating loss of grid power. According to FIG. 1, this means the closure of coupler 114 and the opening of coupler 112. As can be seen from FIG. 4, the use of solid state electronic relays causes the control signals at outputs 250 and 252 to activate (open or close) couplers 114 and 112 only at the zero point of a cycle, as shown by the deactivation of voltage in plot 402 and the activation of voltage in plot 408. This reduces current spikes that would otherwise be caused by non-smooth transitions.

Embodiments of the present invention provide numerous advantages over standard systems employing UPS-based solutions. First and foremost, the requirement of a UPS is obviated, thus saving cost. Furthermore, the electronic relays and control circuit provide a method of switching that is as much as 80% faster than standard mechanical contactors.

Embodiments of the present invention are also useful in analyzing and handling grid disturbances. For example, a circuit of the type 200 can respond within a single half-cycle to power loss, and can respond to the loss of a single phase in a three-phase system. The circuit can also be used to detect a high or low grid condition and disconnect based on an undesirable state. Furthermore, circuits of type 200 can function as frequency detectors for frequency monitoring.

Moreover, embodiments of the present invention obviate the need for more expensive solutions employing digital signal processors (DSPs). If desired, however, embodiments of the present invention can be designed to cooperate with a DSP, for example, by providing an interrupt signal to a DSP upon grid loss.

Embodiments of the present invention are also believed to be advantageous in their modularity. That is, the system can be designed without reference to the particular fuel cell or inverter being used, which allows wide application with minimal integration costs.

The invention has been presented with reference to certain specific and exemplary embodiments. It will be recognized by persons of skill in the art, however, that the invention is not so limited, and may be modified in numerous ways within the scope of this disclosure.

What is claimed is:

1. A circuit, comprising:

a first power source connected to a first opto-electric coupler;

a first line configured to provide a control signal related to a second power source, the first line being connected to a second opto-electric coupler; and logic for emitting a second control signal for switching between the first power source and the second power source upon a change in state of at least one of the first or second opto-electric couplers;

wherein the first opto-electric coupler is connected in parallel with a capacitor, and wherein a transistor of the first opto-electric coupler is connected to an input of a logic gate; and wherein the input of the logic gate is connected to a resistor, wherein the resistor is connected to a reference potential, and wherein the resistor and the capacitor are so dimensioned that a voltage tail begins at the input of the logic gate, as measured against the reference potential, during a negative half-cycle of the first power source.

2. The circuit of claim 1, wherein the second power source comprises at least a portion of a fuel cell system.

3. The circuit of claim 2, wherein the second power source comprises a fuel cell inverter.

4. The circuit of claim 1, wherein the logic for emitting a second control signal emits second and third control signals, the second control signal being transmitted on a line connected to a first electronic relay and the third control signal being transmitted on a line connected to a second electronic relay.

5. The circuit of claim 4, wherein the second electronic relay is connected to function as a switch between the second power source and at least a portion of a fuel cell system.

6. The circuit of claim 1, wherein the first opto-electric coupler is connected in series with a diode, and wherein a direct current power source is connected to the transistor of the first opto-electric coupler.

7. The circuit of claim 1, wherein a switching action of the second opto-electric coupler serves to switch a DC power source.

8. The circuit of claim 1, wherein the circuit assists in performing a frequency monitoring function.

9. The circuit of claim 1, wherein the circuit assists in detecting a high or low grid condition.

10. A method for providing power in a fuel cell system, comprising:

determining in a first step, using a first opto-electric coupler, whether a first power source is present;

determining in a second step, using a second opto-electric coupler, a presence of a first control signal indicative of a second power source;

responsive to the determining in the first and second steps, powering a fuel cell balance of plant load with either the first or second power sources;

wherein the first opto-electric coupler is connected in parallel with a capacitor;

wherein a transistor of the first opto-electric coupler is connected to an input of a logic gate; and wherein the input of the logic gate is connected to a resistor, wherein the resistor is connected to a reference potential, wherein the resistor and the capacitor are so dimensioned that a voltage tail begins at the input of the logic gate, as measured against the reference potential, during a negative half-cycle of the first power source.

11. The method of claim 10, wherein the step of powering a fuel cell balance of plant load with either the first or second power sources comprises providing a second control signal to at least one contactor.

12. The method of claim 11, wherein the step of providing the second control signal to at least one contactor comprises providing two control signals, each control signal being provided to an electronic relay.

13. The method of claim 11, wherein the step of providing the second control signal to the at least one contactor comprises providing the second control signal powered by a fuel cell battery.

14. The method of claim 10, wherein the step of determining in a first step, using a first opto-electric coupler, whether a first power source is present, comprises using a transistor of the first opto-electric coupler as a pull-up transistor connected to the input of the logic gate.

15. The method of claim 10, wherein the first power source comprises a utility grid, and wherein the second power source comprises at least a portion of the fuel cell system.

16. A system for power control, comprising:

a load to be supplied with power;

a first power source connected to the load by way of at least a first electronic relay, wherein the first power source is connected to a first opto-electric coupler;

a second power source connected to the load by way of at least a second electronic relay, wherein the second power source is connected to a second opto-electric coupler; and a control circuit for controlling the first and second relays, such that the relays are in opposite states except during moments of transition;

wherein the first opto-electric coupler is connected in parallel with a capacitor, and wherein a transistor of the first opto-electric coupler is connected to an input of a logic gate; and wherein the input of the logic gate is connected to a resistor, wherein the resistor is connected to a reference potential, and wherein the resistor and the capacitor are so dimensioned that a voltage tail begins at the input of the logic gate, as measured against the reference potential, during a negative half-cycle of the first power source.

17. The system of claim 16, wherein the first power source is a utility grid.

18. The system of claim 17, wherein the second power source comprises a fuel cell.

19. The system of claim 18, wherein the fuel cell is regeneratively coupled to the utility grid.

20. The system of claim 16, wherein the load comprises a balance of plant load associated with a fuel cell, and wherein the balance of plant load is powered by a utility grid during startup of the fuel cell.

* * * * *